United States Patent

[11] 3,626,059

| [72] | Inventors | Balthasar Hegedus<br>Binningen, Switzerland;<br>Hans Thoenen, Bethesda, Md.; Marcel<br>Scheer, Basel, Switzerland |
|------|-----------|---|
| [21] | Appl. No. | 746,311 |
| [22] | Filed | July 22, 1968 |
| [45] | Patented | Dec. 7, 1971 |
| [73] | Assignee | Hoffman-La Roche Inc.<br>Nutley, N.J. |
| [32] | Priority | July 27, 1967 |
| [33] | | Switzerland |
| [31] | | 10768/67 |

[54] TRIHYDROXYPHENYLALANINE FOR TREATMENT OF HYPERTENSION
2 Claims, No Drawings

| [52] | U.S. Cl. | 424/319,<br>260/519 |
|------|----------|---------------------|
| [51] | Int. Cl. | A61k 27/00 |
| [50] | Field of Search | 424/319;<br>260/519 |

[56] References Cited
OTHER REFERENCES

Ferrini et al.-Chem. Abst. Vol. 61 (1964) page 2082a

*Primary Examiner*—Sam Rosen
*Attorney*—Samuel L. Welt

ABSTRACT: 3,4,5-Trihydroxyphenylalanine, its acid and base addition salts and optical isomers thereof are useful as oral therapeutic agents for the treatment of hypertension.

TRIHYDROXYPHENYLALANINE FOR TREATMENT OF HYPERTENSION

BACKGROUND OF THE INVENTION

The compounds used in this invention, i.e., 3,4,5-trihydroxyphenylalanine, its acid and base addition salts and optical isomers, have been found to lower the noradrenaline content of sympathetically innervated organs, the noradrenaline content of the peripheral organs of hypertonic rats, guinea pigs, cats and dogs. These compounds exhibit powerful blood pressure lowering activity. It has further been found that weeklong administration of 3,4,5-trihydroxyphenylalanine to rats, guinea pigs and dogs did not produce detectable toxic, functional or organic side effects.

Position isomers of 3,4,5-trihydroxyalanine, e.g., 2,3,4-, 2,5,6- and 3,5,6-trihydroxyphenylalanines do not demonstrate useful hypotensive properties such as has been shown for the subject compound. Only 2,4,5-trihydroxyphenylalanine exhibits a blood pressure-lowering activity. However, its usefulness is mitigated by its high toxicity.

The mechanism of activity of 3,4,5-trihydroxyphenylalanine is believed to be different than that of dopa. Whereas the hypotensive activity of the former compound is almost completely suppressed by insertion of a methyl group in the α-position, such insertion is required for hypotensive activity in the latter compound. Such facts suggest different action mechanisms for α-methyl dopa and 3,4,5-trihydroxyphenylalanine in the organism. In further support for this distinction in mode of action is the observation that 3,4,5-trihydroxyphenylalanine is essentially free of side effects and, especially, does not induce undersired sedation as has been observed in the use of α-methyl dopa.

SUMMARY OF THE INVENTION

The present invention is concerned with the use of 3,4,5-trihydroxyphenylalanine of the formula

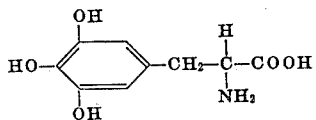

and the addition salts of pharmaceutically acceptable acids and bases and optical isomers of this compound as blood pressure lower compounds.

The compounds of formula I are prepared by various reaction pathways. In one process embodiment of this invention a compound of the formula

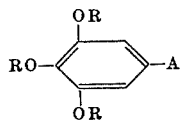

in which R is alkyl, aralkyl or acyl and A is the group
$-CH_2-R_1$
in which $R_1$ is a halogen atom or an alkyl- or arylsulfonyloxy group, is reacted with a compound of the formula

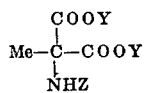

in which Me is an alkali metal, Y is alkyl and Z is acyl, and the resulting product is hydrolized and decarboxylated.

In a further process aspect of the present invention a compound of formula II in which A is a group of the formula

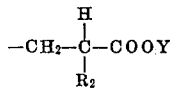

in which Y is alkyl and $R_2$ is carboxyl or cyano is reacted with hydrazine. The resulting acid hydrazide is transformed via the acid azide and isocyanate into the corresponding carbamic acid derivative, and the latter is hydrolized to yield the desired 3,4,5-trihydroxyphenylalanine. In another embodiment a compound of formula II in which A is a group of the formula

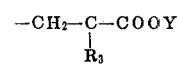

in which Y is alkyl and $R_3$ is imino, hydroxyimino or phenylhydrazono, is hydrogenated and then the ester hydrolized to the acid. The acid is then further hydrolized to remove the protecting groups (R) from the hydroxyls.

The 3,4,5-trihydroxyphenylalanine produced by any of the above methods may be converted, if desired, into its addition salt and/or may be resolved into its optical isomers.

The term "alkyl" as used herein means a straight or branched chain hydrocarbon group containing up to six carbon atoms, such as, for example, methyl, isopropyl or hexyl. The term "aralkyl" is meant to include a phenyl-(lower alkyl) group such as, for example, the benzyl group. The term "acyl" includes lower alkanoyl groups such as, for example, the acetyl or lower aroyl group such as, for example, the benzoyl group. The sulphonyloxy groups mentioned above are preferably linked with lower alkyl radicals (e.g., with the methyl radical) or with optionally alkyl-substituted phenyl groups (especially with the tolyl group).

The compounds of the formula

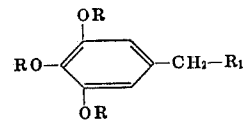

in which R and $R_1$ are as above employed as starting material in the synthesis can, for example, be manufactured by reducing a gallic acid ester in which the hydroxyl groups are preferably substituted by alkyloxy, especially by methoxy groups. This reduction is conducted using a complex metal hydride, preferably lithium aluminum hydride as the reducing agent. A suitable solvent, preferably boiling ether may be employed.

Another preferred procedure involves converting gallic acid by treatment with an alkyl sulfate (e.g., with dimethyl sulfate) into 3,4,5-trimethoxy-benzoic acid. This compound is treated with a halogenating agent, e.g., thionyl chloride and the 3,4,5-trimethoxy-benzoyl chloride obtained is reduced to 3,4,5-trimethoxy-benzyl alcohol upon treatment with sodium borohydride. The alcohol formed is subsequently reacted with a halogenating agent, e.g., with phosphorus trichloride or thionyl chloride, in an inert solvent, such as ether, benzene or methylene chloride, or with a sulfonylating agent, e.g., with methanesulfonyl chloride or p-toluenesulfonyl chloride, in the presence of a base such as pyridine or triethylamine. This halogenation is conducted at a temperature in the range between room temperature and the reflux temperature of the reaction mixture. The desired 3,4,5-trimethoxybenzyl chloride or mesylate or tosylate of formula IIa is thus obtained.

Among the compounds of formula IV suitable for the condensation with the compounds of formula IIa, the sodium salt of acetaminomalonic acid diethyl ester is preferred. HOwever, instead of the acetaminomalonic ester, it is also possible to use as the condensation component the formamino-, benzoylamino- or phthalimido- malonic acid esters, among others.

The condensation is preferably carried out in an inert solvent such as ethanol, benzene, dimethylformamide. In a preferred embodiment the reaction is carried to completion by refluxing the reaction mixture. If dimethylformamide or an alkanol is used as the solvent, the reaction product can be precipitated by addition of water. If benzene is used, the reaction product can be freed from byproducts by washing with water and isolated by evaporation. According to a preferred procedure, the hot alcoholic reaction solution is treated with alcoholic hydrochloric acid, the alkali salt obtained is filtered off while hot and the 3,4,5-trialkoxy or aralkyloxy or acyloxy-benzyl-malonic acid ester is crystallized upon cooling. The esters obtained can be purified by recrystallization when necessary.

The ester formed by condensation of a compound of formula IIa with a compound of formula IV above can, for example, be converted into the desired process product of formula I as follows. The condensation product can be hydrolized to the corresponding acylamino acid by treatment with alkali, for example, with aqueous caustic soda of at least 10 wt. percent concentration and at a temperature in the range between about 20 and 100° C. In this manner the two ester groups are hydrolytically cleaved. Upon neutralization or acidification, one of the two resulting carboxyl groups is decarboxylated. The acyl residue protecting the amino group can then be cleaved off by acidic hydrolysis.

The hydroxyl protecting groups can, for example, be cleaved off as follows.

Acyl and alkyl groups can be cleaved off by acidic or alkaline hydrolysis. One preferred method employs mineral acids, for example dilute hydrochloric acid in an alkanol such as, for example, methanol. Another method of preference involves treatment with alkali, for example, with sodium hydroxide in an aqueous alkanol such as, for example, methanol. The aforesaid hydrolysis reactions are run at a temperature in the range between about 20° and about 100° C.

Aralkyl groups can be cleaved off by hydrogenolysis. The hydrogenolysis is conveniently carried out with catalytically activated hydrogen. Especially suitable as catalysts for this purpose are the noble metal catalysts, particularly palladium.

If the hydroxyl groups are protected by alkyl groups, the condensation product obtained can be hydrolized, decarboxylated and freed from the protecting groups in one step by treatment with refluxing 48 per cent hydrobromic acid.

The compounds of the formula

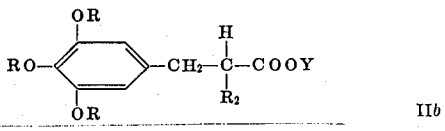

IIb in which R, $R_2$ and Y are as above, employed as starting material in the synthesis can, for example, be prepared by reacting a halide or sulfonate of a compound of formula IIa in the usual manner with an alkali salt of a malonic or cyanoacetic ester in an inert solvent, e.g., in an alkanol, in benzene or dimethylformamide, at elevated temperature, preferably at the reflux temperature of the reaction mixture. Impurities are removed by shaking with water and the phenyl-propionic acid derivative substituted in the α-position by an alkoxycarbonyl or cyano group is isolated by evaporation of the solvent. The α-located alkoxycarbonyl group can be selectively saponified by treatment with, for example, alcoholic aqueous alkali, advantageously by the action of 1 mol of potassium hydroxide in methanol.

The α-carboxy- or -cyano-phenylpropionic acid derivatives of formula IIb obtained may be reacted with hydrazine to yield the corresponding acid hydrazides which by treatment with sodium nitrite are converted into the corresponding acid azides. By heating in an inert solvent, the latter can be transformed into the corresponding isocyanates and these again transformed by addition of alkanols into the corresponding carbamic acid derivatives which, as set out hereinbefore in the case of the synthesis starting from compounds of formula IIa, can be hydrolized and freed from the protecting groups. If $R_2$ in formula IIb signifies a cyano group, this is saponified in the hydrolysis.

The compounds of the formula

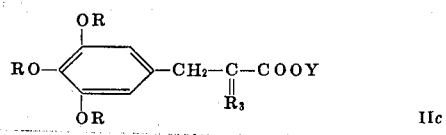

IIc in which R, $R_3$ and Y are as above, employed as starting material in the synthesis can be prepared, for example, by reacting a 3,4,5-trialkoxy or -aralkyloxy or acyloxy, benzyl-malonic acid ester, for example, with an alkyl nitrite in the presence of an alkanol (e.g., in the presence of amyl nitrite in ethanol) and in the presence of a base, (e.g., in the presence of an alkali alcoholate). This reaction may be conducted at a temperature in the range between room temperature and the boiling temperature of the reaction mixture. With the losss of an alkoxycarbonyl group, there is formed the oxime of the trialkoxy or -aralkyoxy or -acyloxy-phenylpyruvic acid ester of formula IIc.

The imides, oximes and phenylhydrazones of formula IIc may be converted into the desired amino acid esters by hydrogenation. The hydrogenation is conveniently carried out with catalytically activated hydrogen. A noble metal, e.g., palladium, is preferably used as the catalyst. The compounds obtained can be hydrolized and freed from the protecting groups as set out hereinbefore in the case of the synthesis starting from compounds of formula IIa.

The trihydroxyphenylalanine of formula I is amphoteric. The carboxy group can, for example, form salts with pharmaceutically acceptable bases. The amino group is capable of forming acid addition salts with pharmaceutically acceptable acids. Examples of suitable bases useful herein include inorganic bases such as ammonia, sodium hydroxide, potassium hydroxide, etc. The acids which may be used include both organic and inorganic acids. Suitable organic acids include benzoic, acetic, tartaric, citric or lactic acids. Preferred inorganic acids include the hydrohalic acids, such as hydrochloric or hydrobromic acids, and sulfuric acids. The trihydroxyphenylalanine of formula I is obtained as the racemate. This can be resolved in a manner known per se. Esters may, for example, be separated with the help of an optically active acid such as tartaric acid. N-acyl derivatives are resolved with the help of an optically active base such as brucine or quinine.

The present invention is also concerned with blood pressure-lowering compositions characterized in that they contain 3,4,5-trihydroxyphenylalanine or pharmaceutically acceptable addition salts or optical isomers of this compound.

Such compositions may be prepared by adding 3,4,5-trihydroxyphenylalanine or an addition salt or its optical isomers to a nontoxic, inert, solid or liquid carrier suitable for therapeutic administration.

The active substances may be processed into orally applicable, hypotensively active preparations in a know manner. The preparations can, for example, contain organic or inorganic carrier material such as water, gelatin, lactose, starches, gum arabic, magnesium stearate, talc, vegetable oils, polyalkylene-gylcols, Vaseline, etc. The preparations can be submitted in solid form, e.g., as tablets, dragees, or in liquid form, e.g., solutions, suspension, or emulsions. They may contain additives such as preserving, stabilizing, wetting or emulsifying agents, salts for varying the osmotic pressure or buffers. Other therapeutically active substances can also be added.

When used a hypotensive agents, the compounds of formula I can be administered perorally to mammals in amounts of about 1000 to 2000 mg. daily. This dosage level is not critical and can be altered upwards or downwards depending on the identity of the subject, the object of the person giving the drug and other parameters readily known to one skilled in the art.

The preparation and use of the compounds of formula I will become more readily apparent by reference to the following examples which are presented for purpose of illustration only.

EXAMPLE 1

Preparation of 3,4,5-Trihydroxyphenylalanine 60 g. of sodium are introduced portion by portion into 2850 ml. of absolute ethanol and allowed to dissolve. 570 g. of acetaminomalonic acid diethyl ester and 750 g. of 3,4,5-trimethoxybenzyl chloride are introduced into the sodium ethanolate solution without cooling. The reaction mixture is stirred at reflux conditions for 4 hours and subsequently treated hot with ca 20 ml. of ca 28 percent ethanolic hydrochloric acid. The pH value of the reaction mixture should be 7. The sodium chloride which precipitates is filtered off hot and washed with 300 ml. of absolute ethanol. The 3,4,5-trimethoxybenzylacetaminomalonic acid diethyl ester which crystallizes from the cooled filtrate is combined in the above wash liquid is separated off. The solid is washed with 200 ml. of ether and with 500 ml. of hexane. The ester melts at 123 –124° C. after drying at 50° in vacuum. 400 g. of 3,4,5-trimethoxybenzylacetaminomalonic acid diethyl ester are heated at 115° C. for 1 hour together with 4 liters of freshly distilled 48 percent hydrobromic acid in a heating bath of 145° C. The methanol and ethanol vapors evolving from the mixture are sucked off. The reaction mixture is subsequently evaporated to dryness. The residue is dissolved in 1 liter of water. The solution is shaken with 20 g. of decolorizing carbon, filtered and adjusted to pH 7 by introduction of ca 400 ml. of diethylamine with stirring and cooling in the ice-bath. The crude 3,4,5trihydroxyphenylalanine which precipitates crystalline in the cold is separated off, washed with 2 to 4 liters of ethanol and dried at 50° C. in vacuum.

The crude product can be purified as follows: 1050 g. of crude 3,4,5-trihydroxyphenylalanine are dissolved in 5 liters of water with the addition of 2-5 ml. of hydrochloric acid. The solution is agitated with decolorizing carbon and filtered. The carbon is washed with 1 liter of water. Wash water and filtrate are combined and treated with 3-5 ml. of diethylamine. The 3,4,5-trihydroxyphenylalanine which precipitates crystalline in the cold is isolated, washed with 4–5 liters of ethanol, dried at 60° C. in vacuum and thereupon dissolved in 73 l. of water at 90° C. The solution is agitated with 100 g. of decolorizing carbon and filtered hot. The carbon is rinsed twice with 5.1 of hot water each time. The wash waters are combined with the filtrate and concentrated to 25 l. The solution is cooled on commencement of the crystallization. The pure crystalline 3,4,5-trihydroxyphenylalanine is successively washed with 1 l. of water and 2 l. of ethanol and dried at 60° C. in vacuum. The compound melts at 295-300° (dec.).

The 3,4,5-trimethoxybenzyl chloride employed as starting compound can, for example, be prepared as follows:

A precooled solution of 3 kg. of sodium hydroxide in 12.5 l. of water is introduced with stirring into a cooled mixture of 2.5 kg. of gallic acid, 12.5 l. of water and 6.2 kg. of dimethyl sulfate so slowly that the temperature of the reaction mixture does not exceed 25° C. After complete addition, the mixture is held at an internal temperature of 50° C. for 1 ½hours, then treated with a solution of 0.5 kg. of sodium hydroxide in 4 l. of water and heated under reflux conditions for 2 hours. The reaction mixture is subsequently cooled to room temperature and treated with 7-8 l. of concentrated hydrochloric acid up to the congo-acidic reaction. The 3,4,5-trimethoxybenzoic acid which separates out upon cooling is washed with water until the wash water no longer reacts congo-acidic and subsequently dried at 60–70° C. in vacuum.

The crude acid is purified as follows:

2.95 g. of 3,4,5-trimethoxybenzoic acid are dissolved with heating in 5.9 l. of ethanol. The solution is shaken with 100 g. of decolorizing carbon and filtered. The pure 3,4,5-trimethoxybenzoic acid which precipitates crystalline on cooling is washed with ethanol/water 1:1 and dried at 100° C. in vacuum. The acid melts at 160–163° C. Further portions of 3,4,5-trimethoxybenzoic acid can be isolated from the mother liquors.

1 kg. of 3,4,5-trimethoxybenzoic acid are mixed with 4 kg. of thionyl chloride, slowly heated up to complete solution and subsequently heated under reflux conditions for 1 hour. The oil remaining behind after distilling off the excess thionyl chloride is further heated in vacuum (external temperature 130° C.) until the last residues of thionyl chloride are removed. The residual 3,4,5-trimethoxybenzoyl chloride can be further processed as follows without further purification.

1.5 kg. of sodium borohydride are carefully introduced under an argon atmosphere with stirring into 7.7 l. of water. The mixture is cooled to 10° C. and treated within 1 hour with a solution of 2.75 kg. of 3,4,5-trimethoxybenzoyl chloride in 12.15 l. of dioxan, care being taken that the reaction mixture does not froth over and does not warm above 20° C. The mixture is further stirred with cooling until no more hydrogen evolution is visible and then decomposed by addition of 1.2 l. of concentrated hydrochloric acid. In doing so, the temperature should not exceed 30° C. The reaction mixture is subsequently extracted four times with a total of 32 l. of chloroform. The combined chloroform extracts are washed with a small amount of water, dried over sodium sulfate, filtered and evaporated to dryness. The residual 3,4,5-trimethoxybenzyl alcohol (b.p. 120–125° C./0.07 Torr; $n_D^{20}$ =1.5409) is practically pure. It can be further processed as follows: 228 ml. of thionyl chloride are added dropwise within 1 hour with intensive stirring and occasional cooling to a mixture of 566 g. of 3,4,5-trimethoxybenzyl alcohol, 260 ml. of pure pyridine and 1.8 l. of absolute ether. The reaction mixture is stirred room temperature for 4 hours. The resulting crystal paste is poured into 2 l. of ice water. The mixture is exhaustively extracted with altogether 2 l. ether. The ether extracts are combined with 200 ml. of a 2N sodium carbonate solution and washed neutral with water, dried over sodium sulfate filtered and evaporated. The residual crude 3,4,5-trimethoxybenzyl chloride is dried in vacuum at 40° C. and further processed without purification.

EXAMPLE 2

3,4,5-Trihydroxyphenylalanine is an amino acid which reduces the noradrenaline-content of sympathetically innervated organs in different types of animals. Investigations on the cat showed that the decarboxylated compound accumulates in the sympathetic nerve endings instead of noradrenaline and with a stimulation of the nerves can be released as a "false transmitter substance" in the same way as the natural transmitter substance. Since the nonphysiological substance is less biologically active than noradrenaline, the effects on the target organ produced by stimulation of the nerves are weakened.

The blood pressure of rats which had become hypertonic by one-sided constriction of both renal poles by implantation of desoxycorticosterone acetate as well as by administration of sodium chloride fell significantly after application of 3,4,5-trihydroxyphenylalanine (measurement according to Gerold et al., Helv. Physiol. Acta 24 (1966), pp. 56-69). After the first dose (100 mg./kg. per os), the systolic blood pressure was observed to fall from 196 to 159 mm. Hg. After administration of the last dose, the blood pressure reverted to the initial value only after about 3 days. The cardiac frequency remain either unaltered or decreased insignificantly (max. −15 percent).

EXAMPLE 3

Preparation of tablets of the following composition:

| | |
|---|---|
| 3,4,5-Trihydroxyphenylalanine | 100 mg. |
| Lactose | 61 mg. |
| Corn starch | 30 mg. |
| Polyvinylpyrrolidone | 4 mg. |
| Talcum | 5 mg. |

The active substance is mixed with the lactose and the corn starch and, after addition of a solution of polyvinyl pyrrolidone in 40 ml. of ethanol, granulated. The granulate is dried at 30° C., mixed with talcum and pressed to tablets.

| | |
|---|---|
| Individual weight of one tablet | 200 mg. |
| Active substance content of one tablet | 100 mg. |

EXAMPLE 4

Preparation of gelatin capsules of the following compositions:

| | |
|---|---|
| 3,4,5-Trihydroxyphenylalanine | 50.0 mg. |
| Mannitol | 98.5 mg. |
| Stearic acid | 1.5 mg. |

The ingredients are homogeneously mixed and filled into No. 2 interlocking capsules via a capsule filling machine.

| | |
|---|---|
| Individual weight of 1 capsule | 150 mg. |
| Active substance content of one capsule | 50 mg. |

EXAMPLE 5

The hypotensive activity of the compounds of formula I is demonstrated in this example. When administered, for example, orally to hypertonic rats, they produce a hypotensive effect in single doses. By way of illustration the compound of example 1 has an $LD_{50}$ of >5,000 mg./kg.(p.o.) in rats and mice and can be administered to rats for 6 weeks in dosages of 2,000 mg./kg./day without showing any undesirable side effects such as sedative effects, exhibits hypotensive activity in a blood pressure test when administered at single oral doses of 50 mg./kg. to 200 mg./kg.

We claim:

1. A composition useful as a hypertensive agent comprising an orally effective dosage of a compound selected from the group consisting of 3,4,5-trihydroxyphenylalanine, pharmaceutically acceptable addition salts and optical isomers thereof in combination with a nontoxic, inert carrier suitable for oral therapeutic administration.

2. A method of treating hypertension in mammals which comprises orally administering to such mammals an orally effective amount of a compound selected from the group consisting of 3,4,5-trihydroxyphenylalanine, pharmaceutically acceptable addition salts and optical isomers thereof.

* * * * *

UNITED STATES PATENT OFFICE
CERTIFICATE OF CORRECTION

Patent No. 3,626,059    Dated December 7, 1971

Inventor(s) Balthasar Hegedus, Marcel Scheer & Hans Thoenen

It is certified that error appears in the above-identified patent and that said Letters Patent are hereby corrected as shown below:

Column 8, claim 1, line 10 "hypertensive" should be:

-- hypotensive --

Signed and sealed this 16th day of May 1972.

(SEAL)
Attest:

EDWARD M. FLETCHER, JR.
Attesting Officer

ROBERT GOTTSCHALK
Commissioner of Patents